United States Patent
Pickett

(10) Patent No.: US 11,932,917 B2
(45) Date of Patent: Mar. 19, 2024

(54) IRON ORE PELLETS

(71) Applicant: Binding Solutions Ltd, Middlesbrough (GB)

(72) Inventor: Nigel Pickett, Bridgend (GB)

(73) Assignee: Binding Solutions Ltd, Middlesbrough (GB)

( * ) Notice: Subject to any disclaimer, the term of this patent is extended or adjusted under 35 U.S.C. 154(b) by 655 days.

(21) Appl. No.: 16/605,736

(22) PCT Filed: Apr. 18, 2018

(86) PCT No.: PCT/GB2018/051010
§ 371 (c)(1),
(2) Date: Oct. 16, 2019

(87) PCT Pub. No.: WO2018/193243
PCT Pub. Date: Oct. 25, 2018

(65) Prior Publication Data
US 2021/0108284 A1 Apr. 15, 2021

(30) Foreign Application Priority Data
Apr. 18, 2017 (GB) .................................... 1706116

(51) Int. Cl.
C22B 1/245 (2006.01)
C21C 5/52 (2006.01)

(52) U.S. Cl.
CPC .............. *C22B 1/245* (2013.01); *C21C 5/527* (2013.01)

(58) Field of Classification Search
CPC ......... C21C 5/527; C22B 1/244; C22B 1/245; Y02P 10/20
See application file for complete search history.

(56) References Cited

U.S. PATENT DOCUMENTS

| | | | |
|---|---|---|---|
| 4,684,549 A | 8/1987 | Allen et al. | |
| 5,000,783 A | 3/1991 | Dingeman et al. | |
| 5,306,327 A | 4/1994 | Dingeman et al. | |
| 5,782,957 A * | 7/1998 | Rinker ................... | C21B 13/10 75/436 |
| 6,071,325 A | 6/2000 | Schmitt | |
| 6,149,709 A | 11/2000 | Uragami et al. | |
| 6,384,126 B1 * | 5/2002 | Pirtle ...................... | C22B 1/244 524/492 |
| 10,683,562 B2 | 6/2020 | Hosono et al. | |
| 2006/0032327 A1 | 2/2006 | Huege et al. | |
| 2012/0210824 A1 * | 8/2012 | Lehtinen ................. | C22B 1/243 425/506 |
| 2014/0033872 A1 | 2/2014 | Martikainen et al. | |
| 2015/0344799 A1 | 12/2015 | Vayda | |
| 2017/0073781 A1 | 3/2017 | O et al. | |
| 2018/0209012 A1 | 7/2018 | Hosono et al. | |

FOREIGN PATENT DOCUMENTS

| | | | | |
|---|---|---|---|---|
| CA | 2869942 A1 * | 10/2013 | ............... | C10L 5/14 |
| CN | 1041328 C | 12/1998 | | |
| CN | 100348746 C | 11/2007 | | |
| CN | 102127640 A | 7/2011 | | |
| CN | 102296138 A | 12/2011 | | |
| CN | 105886755 A | 8/2016 | | |
| EP | 0225171 A2 | 6/1987 | | |
| EP | 1367141 A1 | 12/2003 | | |
| EP | 1439237 A1 * | 7/2004 | ............... | C21B 3/04 |
| EP | 1439237 A1 | 7/2004 | | |
| EP | 3124628 A1 | 2/2017 | | |
| FR | 2098798 A5 | 3/1972 | | |
| GB | 1364150 A | 8/1974 | | |
| JP | 52115601 U | 9/1977 | | |
| JP | 62149825 A | 7/1987 | | |
| JP | 62158812 A | 7/1987 | | |
| JP | 62149825 U | 9/1987 | | |
| JP | 2270921 A | 11/1990 | | |
| JP | 02270921 A | 11/1990 | | |
| JP | 647237 A | 2/1994 | | |
| JP | 09310112 A * | 12/1997 | | |
| JP | 2002322514 A | 11/2002 | | |
| JP | 2003247026 A | 9/2003 | | |
| JP | 2013543052 A | 11/2013 | | |
| JP | 2015218351 A | 12/2015 | | |
| JP | 2016222957 A | 12/2016 | | |
| KR | 20130077158 A | 7/2013 | | |
| RU | 2041961 C1 | 8/1995 | | |
| SU | 1538902 A3 | 1/1990 | | |
| WO | 9924158 A1 | 5/1999 | | |
| WO | 0123627 A1 | 4/2001 | | |
| WO | 03012154 A1 | 2/2003 | | |
| WO | 2007123512 A1 | 11/2007 | | |
| WO | 2018033712 A1 | 2/2018 | | |
| WO | 2018193243 A1 | 10/2018 | | |

OTHER PUBLICATIONS

Direct reduced iron Wikipedia (Year: 2017).*
International Preliminary Report on Patentability for International Application No. PCT/GB2018/051010, Report dated Oct. 22, 2019, dated Oct. 31, 2019, 7 Pgs.
International Search Report and Written Opinion for International Application No. PCT/GB2018/051010, Search completed May 28, 2018, dated Jun. 6, 2018, 10 Pgs.
Search Report under Section 17 for GB Application No. 1706116.9, dated Oct. 31, 2017, 8 Pgs.
Halt et al., "Cold Bonding of Iron Ore Concentrate Pellets", Mineral Processing & Extractive Metall. Rev., 2015, 36: 192-197.

\* cited by examiner

*Primary Examiner* — Jenny R Wu

(57) ABSTRACT

The application describes pellets comprising particulate iron ore and between 0.05 and 1.0% by weight of an organic binder.
The use of such pellets in electric arc furnaces to produce steel is also described.

10 Claims, No Drawings

IRON ORE PELLETS

CROSS REFERENCE TO RELATED APPLICATIONS

This application is a national stage of PCT Patent Application No. PCT/GB2018/051010, entitled "Iron Ore Pellets" to Pickett, filed Apr. 18, 2018, which claims priority to United Kingdom Patent Application No. 1706116.9, entitled "Iron Ore Pellets" to Pickett, filed Apr. 18, 2017, the disclosures of which are incorporated by reference herein in their entirety.

FIELD OF THE INVENTION

The invention relates to pellets containing iron ore for use in electric arc furnaces and to methods of producing steel from such pellets.

BACKGROUND OF THE INVENTION

The production of briquettes from particulate iron and other metal ores is generally known in the art. Typically such particles are bound together using a binder such as cement or clay to form a briquette.

Such briquettes are used in a blast furnace or in direct iron reduction (DRI). The briquette is designed to be sufficiently strong to allow the briquette to be successfully transported and to be used within the blast furnace. The briquette must be able to retain its integrity through the blast furnace into the melting furnace, otherwise the performance of blast furnaces or DRI plants can be adversely affected. A problem associated with using cement or clay is that this increases the amount of silica in the iron and slag produced at the end of the process.

The high strength required for such briquettes has limited the use of more expensive binders such as starch or polyvinyl alcohol (PVA).

SUMMARY OF THE INVENTION

Many embodiments are directed to a pellet comprising a particulate iron ore and between 0.05 and 1.0% by weight, typically less than 0.3% by weight of an organic binder.

In many other embodiments, the organic binder is a polymeric organic binder.

In still many other embodiments, the organic binder is selected from polyacrylamide resin, resole resin, Novolac resin, polyvinyl alcohol and a polysaccharide.

In yet many other embodiments, the particulate iron ore is magnetic.

In still yet many other embodiments, the pellet further comprises a waterproofing agent.

In still yet many other embodiments, the pellet comprises up to 20% by weight of carbonaceous material.

In still yet many other embodiments, the particulate iron ore is capable of passing through a 100 μm mesh prior to pelleting.

Various embodiments are directed to methods of producing steel comprising heating a pellet in an electric arc furnace.

In various other embodiments, the pellet is heated under a reducing atmosphere.

In still various other embodiments, the method includes heating under a reducing atmosphere comprising hydrogen, shale gas or natural gas.

In yet various other embodiments, the method includes mixing with scrap metal.

In still yet various other embodiments, up to 50% by weight of the pellet plus scrap metal is formed of the iron ore pellets.

In still yet various other embodiments, the method includes mixing a particulate iron ore with up to 0.3% by weight of the binder.

In still yet various other embodiments, the method includes providing a pellet, and transporting the pellet to an electric arc furnace and producing steel.

DETAILED DESCRIPTION OF THE INVENTION

Electric arc furnaces heat charged material using an electric arc, for example between two graphite electrodes. As arc forms between the charged material and the electrode. The charge is heated by current passing through the charge and by radiant energy evolved by the arc and can reach 3000° C.

Typically they are used to produce steel from scrap metal. Typically shred (from white goods or cars or other light gauge steel) or heavy melt (large slabs of beams) is used. A problem with using scrap metal is that the quality of the steel input (and thus the steel produced) is often poor. The steel often needs relatively expensive sponge iron or pig iron added to it. Scrap metal currently costs c.$280 per ton and sponge iron is often more expensive than this.

The Applicant realised that using a less expensive source of iron would allow the production of steel using arc furnaces less expensively. One problem with using alternative sources, such as iron ores, is that the iron ore needs reducing to iron. This is not typically carried out in arc furnaces. However, they realised that if they could use iron ore particulate waste and use a reducing atmosphere in the arc furnace, then this could be used.

The production of pellets for using in arc furnaces produces different problems to the convention pellets used in blast furnaces. The pellets need to be sufficiently heavy to break through the layer of slag on the top of the arc furnace. However, they must also be porous enough to allow the iron ore within the pellet to react with a reducing atmosphere within the furnace to produce iron. The iron then mixes with the scrap metal to produce the required steel in the arc furnace. The bonds holding the particles together should also be weak enough to allow the particles to melt and disperse into the molten metal evenly.

The use of particulate materials increases the surface area of the iron oxide so that it is able to react with the reducing atmosphere more efficiently. Moreover, the inventors realised that if they use an organic binder, then this binder is burnt off within the heat of the furnace and increasing the porosity of the pellet so that it more readily reacts with the reducing atmosphere. The cost of pellets of iron ore is typically a 100% premium to the spot price of iron ore (pellets currently cost some $120 per ton). Accordingly, this process allows the reduction of the price of steel produced by the arc furnace.

Moreover, the selection of cheaper reducing gases, also assists in reducing the cost of producing steel using the arc furnace.

The invention provides a pellet comprising a particulate iron ore and less than 1.5% by weight of a binder. The binder is typically an organic binder. As discussed above organic binders have the advantage that they typically are burnt off by the heat of the furnace to increase the porosity of the material within the furnace. The particulate material is typically of a diameter 4 mm or less, more typically less than 1 mm, or less than 500 micron or less than 100 micron. This may be determined by being able to pass through a sieve. Typically at least 10% by weight of particulate material is capable of passing through a 100 μm sieve before to forming into a pellet. More typically a sieve size of 30 μm or 20 μm is used to sieve the material. At least 50%, 80% or 100% of the material may pass through the sieve.

It should be noted that the term "pellet" includes objects commonly referred to as pellets, rods, pencils slugs. Pellets typically have a maximum average diameter of 20 mm, more typically 16 mm or 15 mm, a minimum average diameter of 2 mm, especially 5 mm or an average diameter of 10-12 mm. These object share the common feature of being a compacted form of material and are differentiated principally by their size and shape.

The binder may be a polymeric binder, and may be selected from an organic resin, such as polyacrylamide resin, resole resin or Novolac resin, and/or a polysaccharide such as starch, hydroxyethyl methyl cellulose, gum Arabic, guar gum or xanthan gum. The polysaccharide may be used as a thickening agent. Hydroxyethyl methyl cellulose (MHEC) has been found to have particularly good shelf life. This may be mixed with the organic resin.

For example, the total amount of the binder may be 1.0% by weight, 0.8, 0.6, 0.5, at least 0.05, at least 0.1, or at least 0.2% by weight. The amount of the polysaccharide to the resin, when used in combination, may be 0.1-0.5 wt. % polysaccharide to 0.5-0.1% resin.

Polyvinyl alcohol (PVA) may be used as a binder instead of or in addition to other binders in an amount of 0-0.3, especially 0.1-0.2 wt. %. Typically this is added in addition to the other binders to improve green and cured strength where needed.

Examples of starch include, for example, wheat, maize and barley starch. More typically the starch is potato starch as this is relatively inexpensive.

Polyvinyl alcohol is typically commercially formed from polyvinyl acetate by replacing the acetic acid radical of an acetate with a hydroxyl radical by reacting the polyvinyl acetate with sodium hydroxide in a process called saponification. Partially saponified means that some of the acetate groups having been replaced by hydroxyl groups and thereby forming at least a partially saponified polyvinyl alcohol residue.

Typically the PVA has a degree of saponification of at least 80%, typically at least 85%, at least 90%, at least 95%, at least 99% or 100% saponification. PVA may be obtained commercially from, for example, Kuraray Europe GmbH, Germany. Typically it is utilised as a solution in water. The PVA may be modified to include, for example, a sodium hydroxide content.

Typically the PVA binder has an active polymer content of 12-13% and a pH in the range of 4-6 when in solution.

Resoles are base catalysed phenol-formaldehyde resins with a formaldehyde to phenol ration of greater than one (usually around 1.5). Novolacs are phenol-formaldehyde resins with a formaldehyde to phenol molar ratio of less than one.

Typically additional binders, such as inorganic binders, such as clays, are not added to the particulate material.

A surfactant such as SLS (sodium lauryl sulphate) may be added, for example, a trace amount to improve the wetting of the iron powered by the additives.

Typically the iron ore are tailings or dust, from example, from electric arc furnaces. The ore may be magnetite ($Fe_3O_4$) or haematite ($Fe_2O_3$). The iron ore may comprise naturally occurring contaminants.

The particulate iron ore may have a moisture content of less than 50%, more typically less than 30% or less than 25% moisture content. Typically the moisture content is at least 2% or at least 5% or 10% by weight.

Typically twin-shaft batching mixtures are used to agglomerate the mixture. Overall a press or an extruder is typically used to form the pellets.

A waterproofing agent may be used to enhance the weather resistance of the material of the pellet. This may be combined with a particulate material or as a layer on the external surface of the pellet, for example by spraying. This includes, for example, styrene-acrylate copolymers, and bitumen emulsions.

The pellet may additionally comprise up to 20% by weight of carbonaceous material. Carbonaceous material may be, for example, coke, carbon black, peat or coal. The coal may be any grade of coal, including lignites, sub bituminous coal, bituminous coal, steam coal or anthracite. The carbonaceous material is typically particulate and may have a particle size as defined above for the iron particles.

The pellet may comprise less than 15%, less than 10% or less than 5% by weight of the carbonaceous material.

The pellet is typically cold formed, for example without sintering, or heating to above 60° C. or above 40° C. of 30° C. prior to being put in the furnace.

Methods of producing steel comprising heating a pellet according to the invention in a furnace, such as an electric arc furnace are also provided. Typically the pellet is heated under a reducing atmosphere to convert the iron ore into iron to be incorporated into steel. The reducing atmosphere may be, for example, hydrogen, shale gas or other natural gas. Hydrogen gas is often produced as a bi-product from the processing of fossil fuels. Shale gas is a natural gas that is found trapped within shale formations. It has become an increasingly important source of natural gas in the United States and interest has spread to potential gas shales in the rest of the world. This has become a relatively cheap source of natural gas. Alternative sources of natural gas include, for example, natural gas deposits from within the gas field of the North Sea, off the coast of the United Kingdom.

The method typically includes mixing the pellet with scrap metal. Typically up to 50% by weight of the total of the pellets plus scrap metal is iron ore pellets. More typically the amount of pellets used is less than 40%, less than 30%, less than 20% or at least 5% by weight of pellets.

Methods of producing pellets, according to the invention, comprise mixing a particulate iron ore with up to 0.3% by weight of the binder is also provided. The binder and iron ore may be as defined above. As indicated above, typically twin-shaft batching mixes as used to agglomerate a mixture. Typically extruders may be used to form the pellets.

The amount of compaction of the pellet may be varied, for example, by placing the mixture of the particulate iron ore and binder under greater or lesser amounts of vacuum depending upon the amount of compaction required. A greater amount of vacuum will increase the compaction of the pellet. Alternatively, this may be controlled by the amount of pressure used to form the pellet.

The invention also provides a method of producing steel comprising providing a pellet according to the invention, which is optionally produced by the method of producing the pellet according to the invention, transporting the pellet to an electric arc furnace and producing steel by a method of the invention.

The pellet may be produced at a separate site to where it is used. That is the pellet may be produced where there are deposits of, for example, iron ore fines, made into pellets by combining with the binder, and then transported to the electric arc furnace at a geographically separate site. Transportation may be, for example, by boat, road or rail.

Alternatively, a binder may be mixed with particulate iron ore on substantially the same site as the arc furnace, then placed into the arc furnace.

The pellets may be put into the arc furnace by, for example, a conveyor belt or other suitable means for moving the pellets into the arc furnace.

The invention will now be described by way of example only.

Investigation into Reduction Properties of
Cold-Bonded Iron Ore Pellets in Blast Furnace,
Direct Reduction and Submerged Arc Furnace
Conditions Various samples were tested by the following method:

Pellets were place in a small Inconel retort and surrounded with activated charcoal granules. The container was closed and placed inside a muffle furnace. The furnace was cycled at various heat and times, to simulate the condition within full size plants.

The condition of the samples was assessed when they were naturally cooled to room temperature 1. Sample Type: Unbeneficated Ore, Predominantly Haematite 16×16 mm pellets using a binder that includes a resol type resin in powder form and a liquid polymer binder for green strength. Cold compressive strength>5 kN.

Tests cycle
a. 600 C/30 mins
b. 600 C/2 hrs
c. 1000 C/1 hr
Results:
a. Samples developed micro-cracking easily visible by microscope. Samples had developed some magnetivity, indicating reduction to magnetite.
b. Samples were significantly magnetic and there was an increase in dimension of 1-3% due to swelling cracking
c. Samples were hardened and dimensions had reverted to the original size 2. Sample Type: Beneficated Ore, Predominantly Magnetite 16×16 mm pellets using a binder that includes a resol type resin in powder form and a liquid polymer binder for green strength. Cold compressive strength>6 kN.

Tests cycle
a. 600 C/30 mins
b. 600 C/2 hrs
c. 1000 C/1 hr
Results
a. No changes observed
b. Pellet was vesicular in nature when studied under the microscope
c. Dimensional change—smaller by 5-10%, Highly vesicular 3. Sample Type: Mixed BF Wastes
16×16 mm pellets using a binder that includes a liquid polymer binder. Cold compressive strength>5 kN.
Tests cycle
a. 600 C/30 mins
b. 1100 C/1 hr Results
a. Colour change and strength loss
b. Highly vesicular, strength increase, evidence of sinter bonds 4. Sample Type: Mixed EAF dusts
32×32 mm pellets using an organic liquid binder
Tests cycle
a. 600 C/30 mins
b. 1000 C/1 hr
Results
a—no change observed
b—decrease in volume 25%. Little change in strength 5. A low grade haematite ore tailings in the size of 0-50 micron has an as found moisture content of 20%. To the ore add 0.5% anionic polyacrylamide powder in the size range −500 microns and mix in a high-shear mixer. Add a trace amount of surfactant such as SLS as an aid to production. Extrude using vacuum extrusion through 15 mm apertures and cut to pellet dimensions. The moisture content before extrusion is 20%, after extrusion 16%. Curing time is 24 hrs at 25 C. Test results: compressive strength>250 kg/cm2. RDI to ISO 4696-2 static=36.

6. A high grade magnetite concentrate with a density of 2.3-2.5 t/m3, grading 0-100 micron and moisture content of 13% +/−3. This is typical of many haematite ores when beneficiated to pellet grades. To the ore, add 0.2 of a synthetic thicker such as hydroxy ethyl methyl cellulose with a high mw and 0.5% of a novolac resin which is water soluble and in powder form, then mix in a high-shear mixer. Gums such as gum Arabic, guar and xantham may also be used but have been found to have less shelf-life in the field. Extrude using vacuum extursion through 15 mm apertures and cut to pellet dimensions. After 24 hrs cure at 25 C, the pellets have strengths>250 kg/cm2. Thermal stability at 550 and 900 C has been found to be:

550 C/1 hr—retains>50% strength
900 C/1 hr—retains>60% strength

PvOH can be added to the mixture at 0.1-0.2% to increase the green and cured strength to >400 kg/cm2.

7. Electric Arc Furnace dust from bag house filters:
An alternative binder is MHEC high mw in a 2% solution.
Add 5-10% and mix with a high shear mixer.

The invention claimed is:

1. A method of producing steel comprising:
providing a pellet configured for use in an electric arc furnace, wherein the pellet comprises a particulate iron ore, between 0.05 and 1.0% by weight of a polymeric binder comprising, Novolac resin and at least one binder selected from polyacrylamide resin, resole resin, polyvinyl alcohol and a polysaccharide;
producing the pellet by mixing the particulate iron ore with the polymeric binder, wherein the pellet is formed without sintering or heating the pellet to above 60° C. prior to being transported to the electric arc furnace;
transporting the pellet to the electric arc furnace; and
producing steel by heating the pellet in the electric arc furnace.

2. The method according to claim 1, wherein the pellet is heated under a reducing atmosphere.

3. The method according to claim 2, wherein the reducing atmosphere comprises hydrogen, shale gas or natural gas.

4. The method according to claim 1, further comprising mixing the pellet with scrap metal to form a mixture.

5. The method according to claim 4, wherein the pellet comprises up to 50% by weight of the mixture.

6. The method according to claim 1, further comprising mixing the particulate iron ore with up to 0.3% by weight of the polymeric binder.

7. The method according to claim 1, wherein the particulate iron ore is magnetic.

8. The method according to claim 1, wherein the pellet further comprises a waterproofing agent selected from the group consisting of a styrene-acrylate copolymer, and a bitumen emulsion.

9. The method according to claim 1, wherein the pellet additionally comprises up to 20% by weight of carbonaceous material.

10. The method according to claim 1, wherein the particulate iron ore is capable of passing through a 100 μm mesh prior to pelleting.

* * * * *